United States Patent
Kon et al.

[11] Patent Number: 6,125,315
[45] Date of Patent: Sep. 26, 2000

[54] THROTTLE CONTROLLER FOR LIMITING DEGREE OF OPENING OF THROTTLE IN STALL STATE

[75] Inventors: Takanori Kon; Yasushi Inagawa; Yoshiharu Saito, all of Wako, Japan

[73] Assignee: Honda Giken Kogyo Kabushiki Kaisha, Tokyo, Japan

[21] Appl. No.: 09/217,082

[22] Filed: Dec. 21, 1998

[30]        Foreign Application Priority Data

Dec. 22, 1997 [JP] Japan .................................... 9-353787

[51] Int. Cl.$^7$ ........................................................ G06F 7/00
[52] U.S. Cl. .............................. 701/54; 701/51; 701/101; 477/95; 477/92; 477/93; 477/111; 477/107; 477/143
[58] Field of Search ................................ 701/54, 51, 101; 477/95, 92, 93, 111, 107, 143

[56]              References Cited

U.S. PATENT DOCUMENTS

| | | | |
|---|---|---|---|
| 5,065,319 | 11/1991 | Iwatsuki et al. | 364/424.1 |
| 5,637,054 | 6/1997 | Tanaka | 477/111 |
| 5,772,553 | 6/1998 | Tsukamoto et al. | 477/95 |
| 5,842,950 | 12/1998 | Tsutsui et al. | 477/143 |

FOREIGN PATENT DOCUMENTS 7-332479   12/1995   Japan .

*Primary Examiner*—William A. Cuchlinski, Jr.
*Assistant Examiner*—Ronnie Mancho
*Attorney, Agent, or Firm*—Armstrong, Westerman, Hattori, McLeland & Naughton

[57]                ABSTRACT

A throttle controller is provided so as to reduce a load imposed on the drive and transmission system in the stall state in which both the accelerator and brake are depressed. The controller comprises a throttle control section for calculating a degree of opening of the throttle for generating a driving force in accordance with the actual degree of depression of the accelerator used as a target degree of opening of the throttle so as to drive the vehicle by a target driving force calculated based on the actual degree of depression of the accelerator; a section for determining the stall state in which the gear lever is in a driving gear; the actual degree of depression of the accelerator is larger than a predetermined degree; the brake is operated; and the speed is smaller than a predetermined speed; and a storage section for storing a predetermined degree of opening of the throttle which is read out when the actual degree of depression of the accelerator is larger than the predetermined degree, and wherein the throttle control section limits the target degree of opening of the throttle to the predetermined degree stored in the storage section when the stall state of the vehicle is determined.

4 Claims, 4 Drawing Sheets

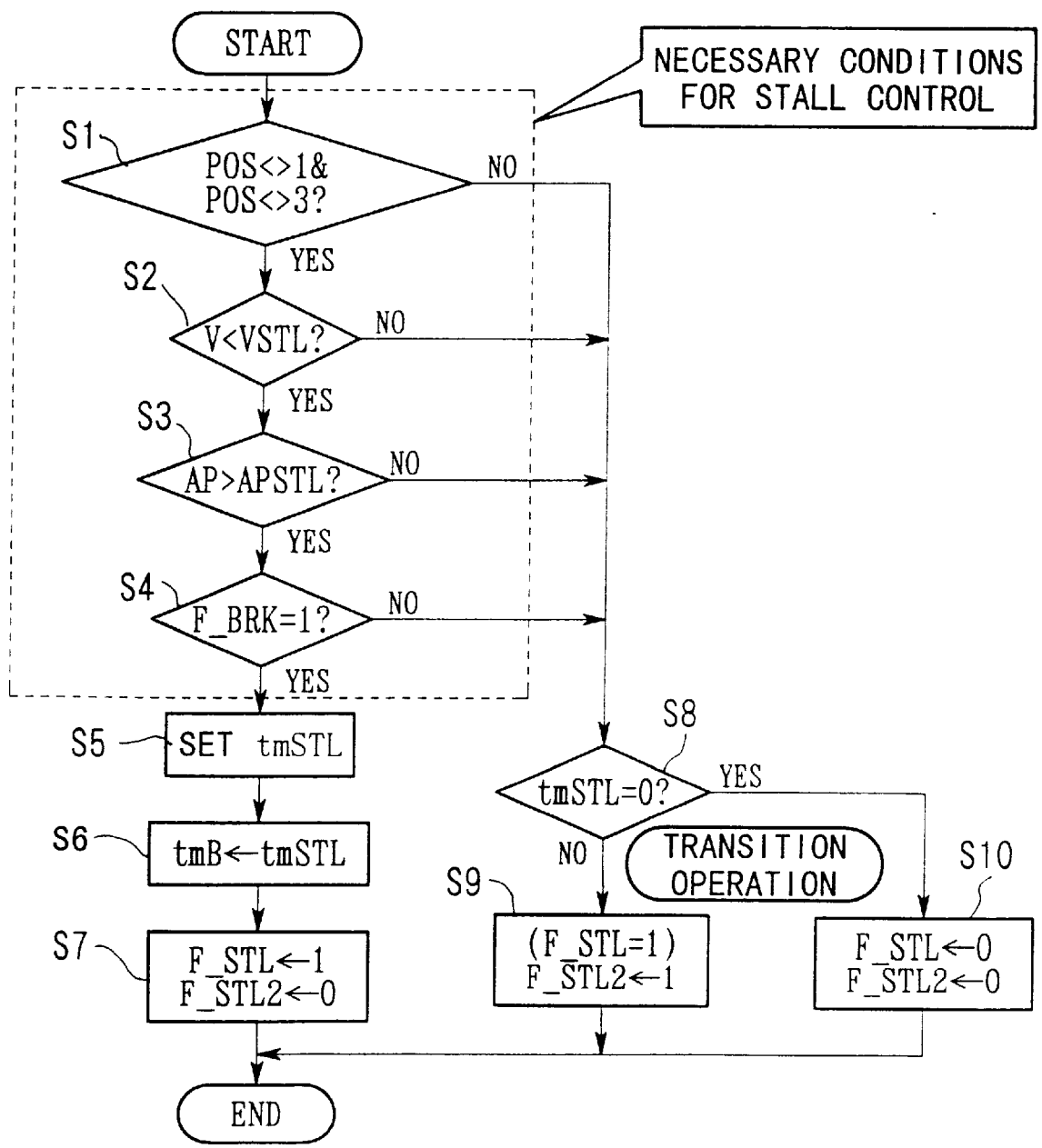

THROTTLE CONTROLLER FOR LIMITING DEGREE OF OPENING OF THROTTLE IN STALL STATE

BACKGROUND OF THE INVENTION

1. Field of the Invention

The present invention relates to a throttle controller for controlling a throttle (valve) in a vehicle comprising an automatic transmission.

This application is based on Patent Application No. Hei 9-353787 filed in Japan, the contents of which are incorporated herein by reference.

2. Description of the Related Art

Generally, in conventional vehicles comprising an automatic transmission having a hydraulic torque converter, when the throttle (valve) thereof is opened in accordance with the amount of force exerted on the accelerator pedal while the gear lever is in a driving gear (or setting), the driving force of the engine is transmitted via the torque converter, clutch, and the like, to the wheels. Japanese Patent Application, First Publication, No. Hei 7-332479 discloses an example of such an automatic transmission, which comprises a lock-up clutch controller.

In addition, under some conditions in a driving gear, a vehicle may be started by releasing the brake pedal from the so-called stall state, that is, a state in which both the brake and accelerator pedals are simultaneously depressed.

When the vehicle is in the stall state and driving force occurs in accordance with the amount of force exerted on the accelerator pedal, a large load is imposed on the drive and transmission system including the torque converter, clutch, and the like. This problem often most notably occurs when the degree of depression of the accelerator (pedal) is relatively large.

In addition, when the vehicle is started from the stall state by releasing the brake, the vehicle is immediately (or abruptly) accelerated as a result of receiving a large driving force. Therefore, also in this case, significant stress is imposed on the drive and transmission system including the torque converter, clutch, and the like. Furthermore, the driving efficiency may be reduced due to such an immediate or abrupt start in the above case.

SUMMARY OF THE INVENTION

In consideration of the above circumstances, an object of the present invention is to provide a throttle controller for reducing the load imposed on the drive and transmission system in the stall state in which both the accelerator and brake are depressed, and to accelerate the vehicle with less stress on the drive and transmission system and with superior driving efficiency when the brake is released from the stall state.

In order to realize the above object, the present invention provides a throttle controller used for a vehicle comprising an automatic transmission including a torque converter, the controller comprising:

a throttle control section for calculating a degree of opening of the throttle of the vehicle for generating driving force in accordance with the actual degree of depression of the accelerator of the vehicle, the degree of opening used as a target degree of opening of the throttle so as to drive the vehicle by a target driving force calculated based on the actual degree of depression of the accelerator;

a stall condition determining means for determining a stall state in which the gear lever of the vehicle is in a driving gear; the actual degree of depression of the accelerator is larger than a predetermined degree of depression for determining the stall state; the brake of the vehicle is operated; and the speed of the vehicle is smaller than a predetermined speed; and a storage section for storing a predetermined degree of opening of the throttle which is read out when the actual degree of depression of the accelerator is larger than the predetermined degree of depression of the accelerator for determining the stall state, and wherein the throttle control section limits the target degree of opening of the throttle to the predetermined degree of opening stored in the storage section when the stall condition determining means has determined that the vehicle is in the stall state.

According to the above structure, it is possible to limit the target degree of opening of the throttle to a predetermined degree of opening when the vehicle is in the stall state in which the gear lever is in a driving gear; the actual degree of depression of the accelerator is larger than a predetermined degree of depression for determining the stall state; the brake is depressed; and the speed is smaller than a predetermined speed. The above predetermined degree of opening of the throttle can be a value for generating an engine speed by which causes no undesired effect on the drive and transmission system including the torque converter, clutch, and the like in the stall state. Therefore, it is possible to prevent exerting an excessive load on the drive and transmission system, and to realize a very advantageous situation in consideration of the durability.

The throttle controller having the above structure may further comprise a transition timer for counting a predetermined time, the counting being started when the brake is released, after the determination of the stall state. In this case, the throttle control section calculates the target degree of opening of the throttle in a manner such that the target degree of opening of the throttle is shifted from the predetermined degree of opening of the throttle to the degree of opening of the throttle for generating driving force in accordance with the actual degree of depression of the accelerator, during counting of the predetermined time by the transition timer.

Accordingly, after the brake is released and the vehicle is released from the stall state, the target degree of opening of the throttle is shifted from the predetermined degree of opening of the throttle to the degree of opening of the throttle for generating a driving force in accordance with the actual degree of depression of the accelerator, for a predetermined time. Therefore, it is possible to remarkably reduce the stress on the drive and transmission system (including the torque converter, clutch, and the like) due to an abrupt change of driving force, and to ease the shock caused by an abrupt and immediate acceleration of the vehicle. As a result, a very excellent driving efficiency can be achieved.

BRIEF DESCRIPTION OF THE DRAWINGS

FIG. 2 is a flowchart for explaining an operational flow of the throttle control by the throttle controller in the embodiment.

DESCRIPTION OF THE PREFERRED EMBODIMENTS

Hereinbelow, the throttle controller according to the present invention will be explained with reference to the drawings.

Figure 1:
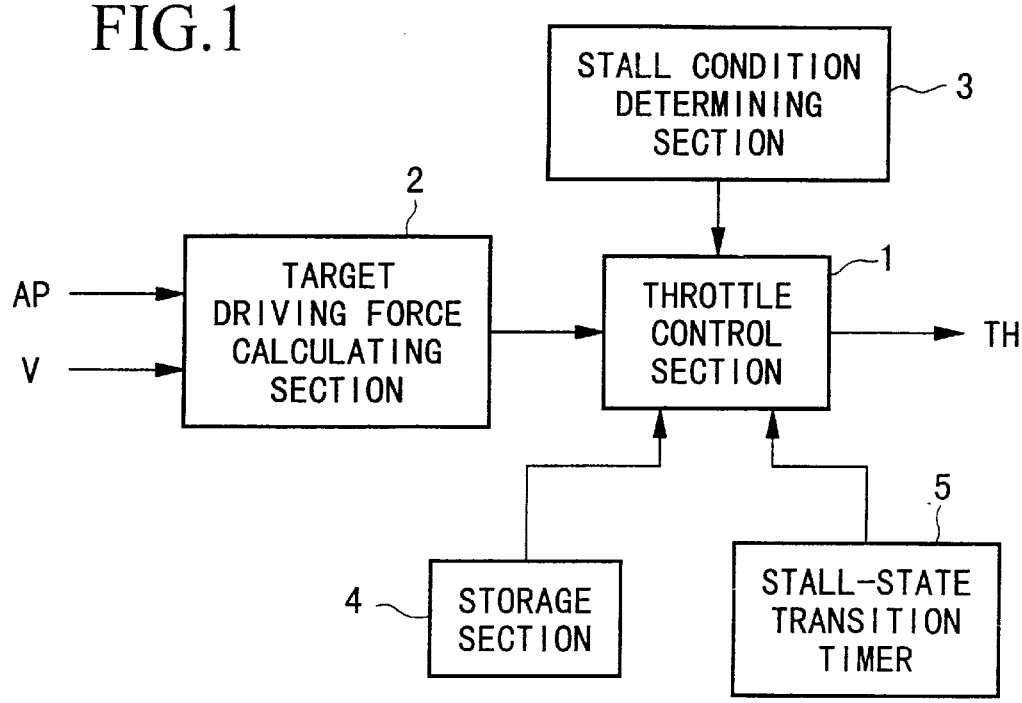
FIG. 1 is a block diagram showing the general functional structure of the throttle controller as an embodiment according to the present invention.

First, the constitution of the throttle controller will be explained with reference to FIG. 1.

In the figure, reference numeral 1 indicates a throttle control section, to which target driving force calculating section 2 is connected. This calculating section 2 calculates the target driving force (i.e., the target torque to be generated by the engine) according to the acceleration intended by the driver, based on the detected values related to degree of depression AP of the accelerator (pedal) and speed V of the vehicle, and outputs a signal indicating the calculated target driving force to throttle control section 1.

The throttle control section 2 outputs a signal indicating the target degree of opening THCMDA of the throttle (that is, a command for controlling the throttle) to throttle TH so as to generate the target driving force. In a normal control (mode) of the driving force, the degree of opening THCMDX of the throttle for generating a driving force in accordance with the degree of depression AP of the accelerator is used as the above target degree of opening THCMDA of the throttle.

The stall condition determining section 3 is also connected to the throttle control section 1. This determining section 3 determines whether the vehicle is in the stall state, and outputs the determined result to the throttle control section 1.

In this stall state, (i) the gear lever is in a driving gear; (ii) the degree of depression AP of the accelerator is larger than a degree of depression APSTL of the accelerator, this degree being predetermined for determining the stall state; (iii) the brake is depressed; and (iv) the vehicle speed V is less than a vehicle speed VSTL which is also predetermined for determining the stall state.

The throttle control section 1 executes throttle control if the stall condition determining section 3 has determined that the vehicle is in the stall state.

Reference numeral 4 indicates a storage section, in which a predetermined degree of opening THSTL of the throttle is stored. This value THSTL is read out from the storage section 4 if the degree of depression AP of the accelerator is larger than the above-mentioned degree of depression APSTL of the accelerator for determining the stall state.

As a selected value for the above predetermined degree of opening THSTL, it is considered that no undesired effects are exerted on the drive and transmission system (including the torque converter, clutch, and the like) in the stall state.

Reference numeral 5 indicates a stall-state transition timer. After the stall condition determining section 3 has determined that the vehicle is in the stall state, and then determines that the vehicle has changed to a "no stall state", the transition timer 5 starts the counting of a fixed time "tmSTL". During this counting operation of the timer, the throttle control section 1 calculates the target degree of opening THCMDA of the throttle from the above-mentioned predetermined degree of opening THSTL to the above-mentioned THCMDX for generating a driving force in accordance with the degree of depression AP of the accelerator.

Figure 3:
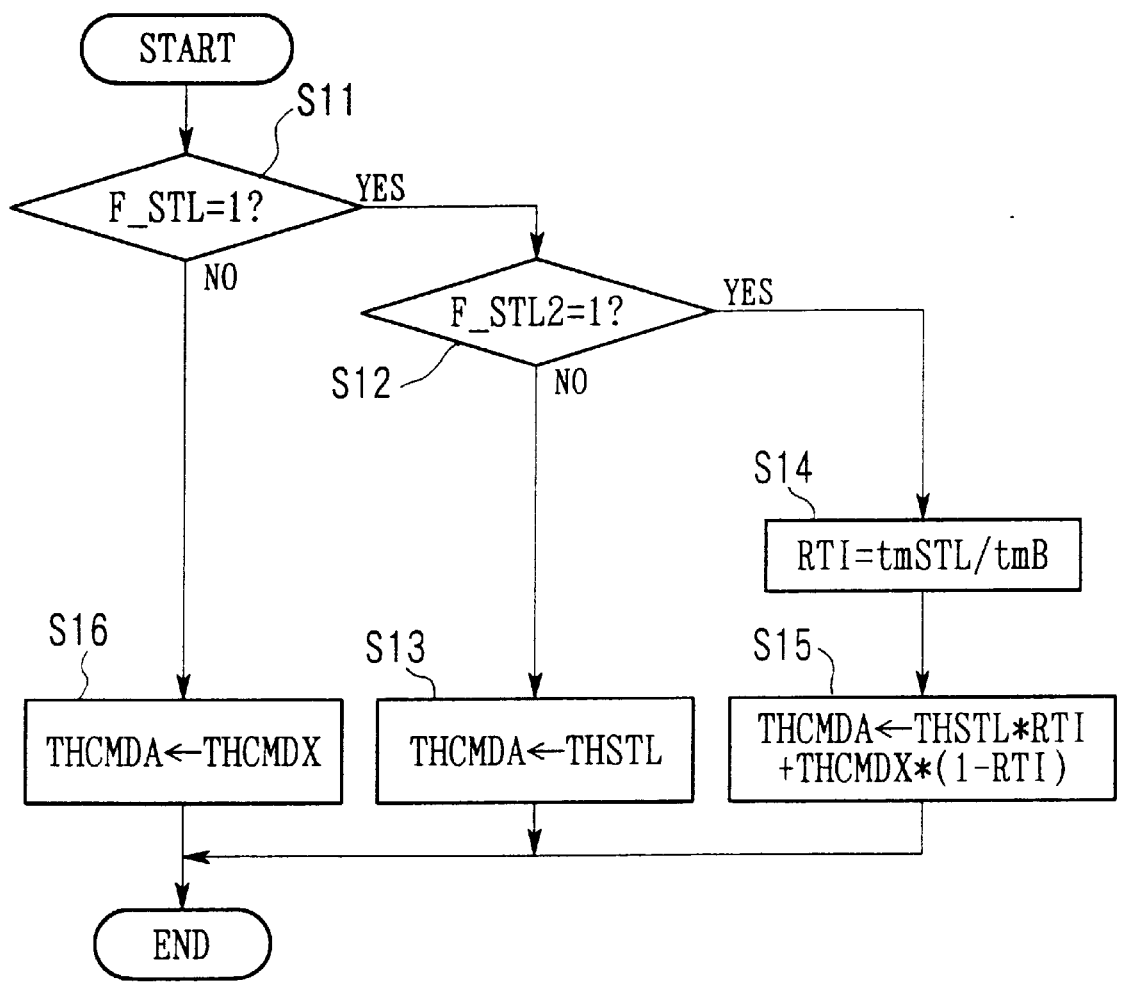
FIG. 3 is a flowchart for explaining an operational flow of the throttle control by the throttle controller in the embodiment.

Hereinafter, operations of throttle control performed by the above throttle controller when the stall state is determined will be explained with reference to flowcharts of FIGS. 2 and 3.

First, control of the flags used in the stall control will be explained using the flowchart of FIG. 2.

In the following steps S1 to S4, it is determined whether the vehicle is in the stall state. If in the stall state, stall control is necessary.

Step 1: It is determined whether the position of the gear lever, that is, shift position POS, is in a driving gear other than gear 1 (indicating the "parking" state) and gear 3 (indicating the "neutral" state).

Step 2: It is determined whether vehicle speed V is smaller than the above vehicle speed VSTL for determining the stall state.

Step 3: It is determined whether the degree of depression AP of the accelerator is larger than the predetermined degree of depression APSTL for determining the stall state.

Step 4: It is determined whether the brake is depressed, and flag F_BRK is set to 1 and thus the brake is operated.

The stall state of the vehicle is determined according to the above tests and set by the stall condition determining section 3, when the shift position POS is neither 1 ("parking") nor 3 ("neutral"); the speed V is smaller than VSTL; the degree of depression AP of the accelerator is larger than APST; and the flag F_BRK indicates 1.

Stall state: Steps S5 to S7

If the stall condition determining section 3 determines the stall state via the above steps 1 to 4, then the above-mentioned measurement time "tmSTL" with respect to the stall transition timer 5 is set and this measurement time "tmSTL" is determined as a transition timer base value "tmB". In addition, main stall flag F_STL is set to 1 while sub stall flag G_st12 is maintained at 0.

State during transition operation: Steps S8 and S9

After the determination of the stall state, when the brake is released and the stall condition determining section 3 determines that the vehicle has changed to a nonstall state, a decrement operation of the base value "tmB" of the stall transition timer 5 is started, and sub stall flag F_STL2 is set to 1 during the decrement operation.

State when transition operation is terminated: Steps S8 and S10

When the counter value of the stall-state transition timer 5 reaches 0, the transition operation is terminated and both main stall flag F_STL and sub stall flag F_STL2 are set to 0 (that is, both flags are reset).

Hereinbelow, control of the target degree of opening THCMD of the throttle will be explained with reference to the flowchart of FIG. 3 and diagrams of FIGS. 4 and 5. The control is performed with reference to flags controlled in each state.

Figure 4:
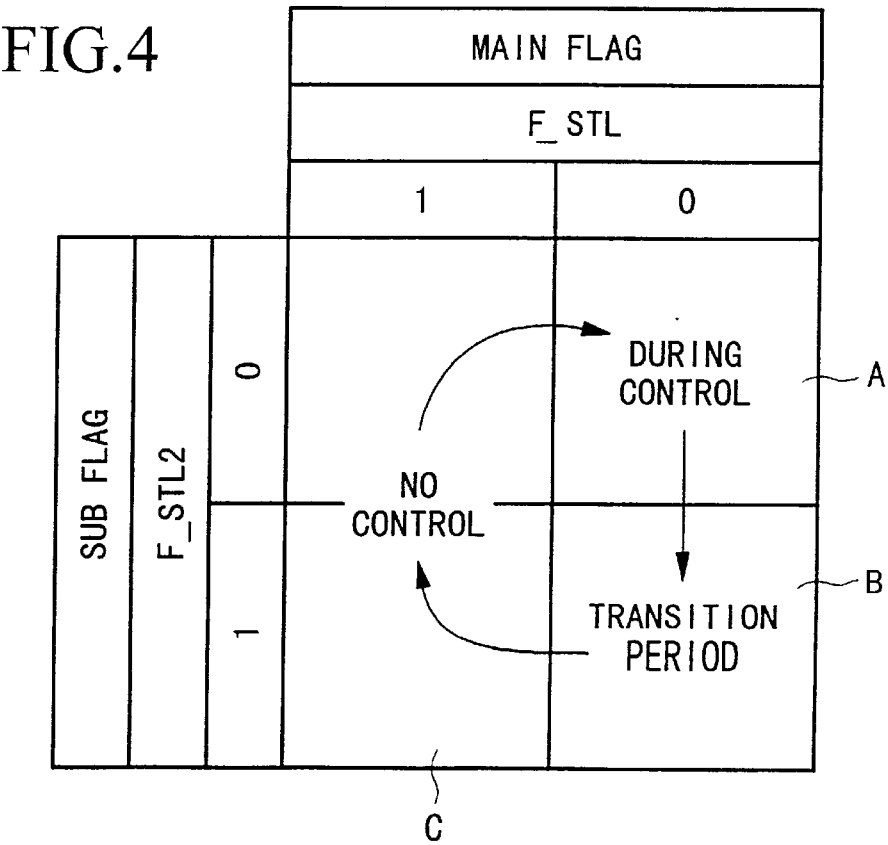
FIG. 4 is a diagram for explaining a relationship between each flag in the throttle control by the throttle controller in the embodiment.
Figure 5:
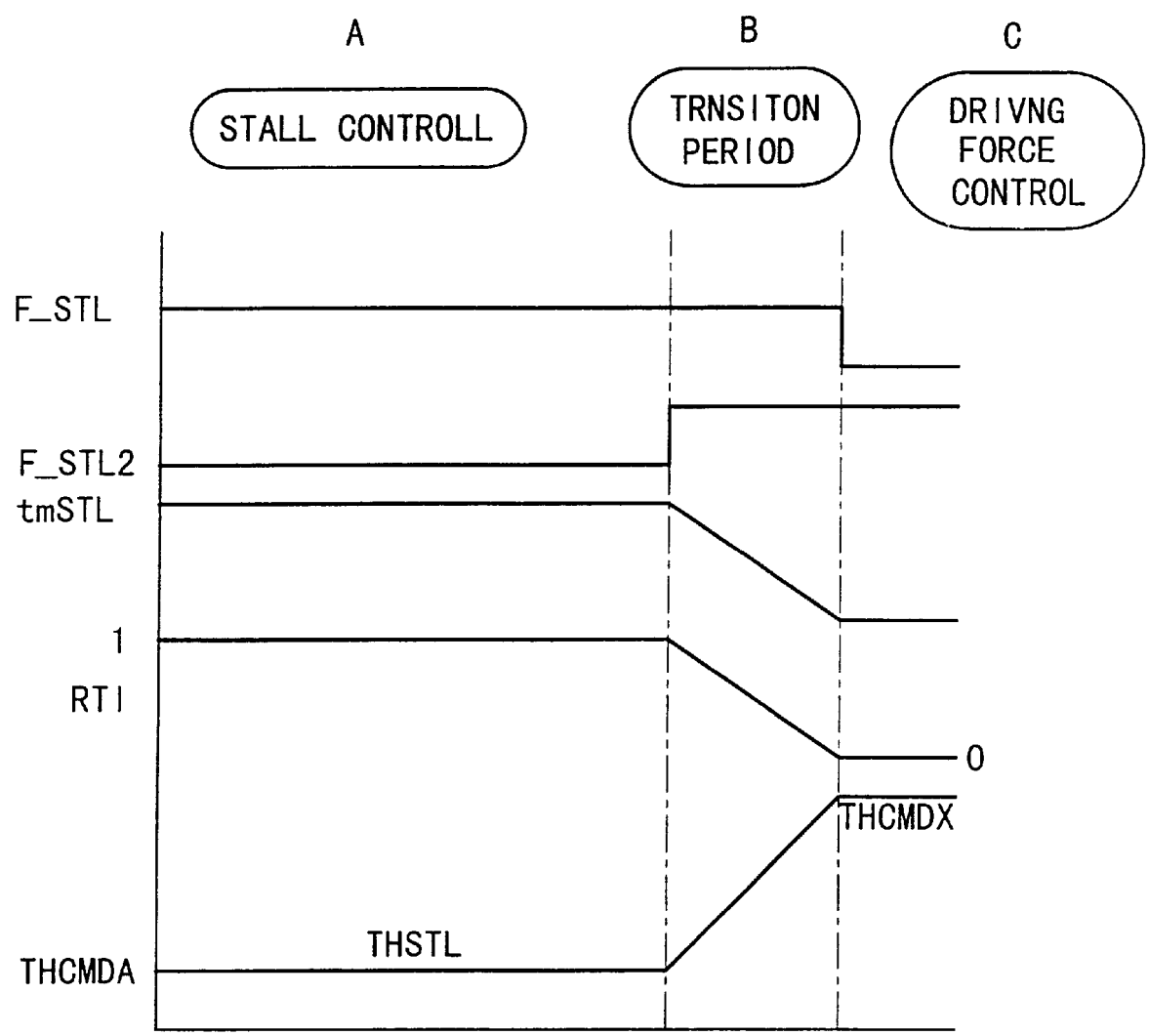
FIG. 5 is a timing chart at the throttle control by the throttle controller in the embodiment.

(1) In the stall state (corresponding to "during (stall) control" A in FIGS. 4 and 5)

In this state, main stall flag F_STL is 1 and sub stall flag F_STL2 is 0 (see steps S11 and S12); thus, the operation shifts to step S13. Therefore, the predetermined degree of opening THSTL of the throttle, which is read out from storage section 4 when the degree of depression AP of the accelerator is larger than the predetermined degree of depression APSTL for determining the stall state is used for the actual and final target degree of opening THCMDA of the throttle.

Here, until the degree of depression AP exceeds APSTL, the target degree of opening of the throttle is set according to the actual degree of depression of the accelerator.

When selecting the value for the degree of depression APSTL for determining the stall state, it is considered that when the accelerator is depressed from the state in which the degree of depression AP of the accelerator and the degree of opening of the throttle are maximum (that is, both are fully opened), no undesired effects are exerted on the drive and transmission system (including the torque converter, clutch, and the like) in the stall state. Therefore, a degree of depression of the accelerator (for example, 5°) providing a degree of opening of the throttle for generating an engine speed satisfying the above conditions is selected. Here, the accelerator is actually depressed by the driver. Therefore, in order to prevent the driver from remarkably having a sense of unresponsiveness, a suitable degree of opening of the throttle is provided so as to appropriately make the driver feel a change (i.e., increase) of the engine speed.

(2) In the state during the transition operation (corresponding to "(stall) transition period" B in FIGS. 4 and 5)

In this state, both main stall flag F__STL and sub stall flag F__STL2 are 1 (see steps S11 and S12); thus, the operation shifts to steps S14 and S15, where the target degree of opening THCMDA of the throttle is calculated based on the elapsed time of the transition.

In step 14, a distribution rate RTI for determining the contribution ratio of the predetermined degree of opening THSTL of the throttle to the target degree of opening THCMDA of the throttle is calculated using the following equation:

$$RTI = tmSTL/tmB \qquad (1)$$

In the next step S15, the target degree of opening THCDMA of the throttle, the final target value at the present phase, is calculated using the following equation, based on the distribution rate RTI calculated in the above step S14.

$$THCMDA = THSTL \times RTI + THCMDX \times (1-RTI) \qquad (2)$$

That is, in the state during the transition operation, the final target degree of opening THCMDA of the throttle is calculated based on the equations (1) and (2) every moment, so that the degree of opening of the throttle is gradually shifted from THSTL to THCMDX.

(3) In the state when and after the transition operation is terminated (corresponding to "no control" C in FIG. 4 and "driving force control" in FIG. 5)

In this state, main stall flag F__STL is 0 (see steps S11, and sub stall flag F__STL2 is also 0); thus, the operation shifts to step S16, where the target degree of opening THCMDA of the throttle is set to the degree of opening THCMDX of the throttle for generating a driving force in accordance with the degree of depression AP of the accelerator. After that, the throttle TH is controlled using this degree of opening THCMDX.

As explained above, according to the above throttle controller, in the stall state in which the gear lever is in a driving gear; the vehicle speed V is less than the vehicle speed VSTL; the accelerator is depressed and the degree of depression AP of the accelerator is larger than the predetermined degree of depression APSTL for determining the stall state; and the brake is depressed and is operated, the degree of opening of the throttle TH is limited to the predetermined degree of opening THSTL for generating an engine speed by which no undesired effects are exerted on the drive and transmission system including the torque converter, clutch, and the like. Accordingly, it is possible to prevent exerting excessive loads on the drive and transmission system in the stall state, and a very advantageous state in consideration of durability can be obtained.

Furthermore, after the stall state is released, the degree of opening of the throttle is gradually shifted from THSTL (for generating an engine speed by which exerts no undesired effect on the drive and transmission system including the torque converter, clutch, and the like) to THCMDX (for generating a driving force in accordance with the actual degree of depression AP of the accelerator) in the predetermined period "tmSTL". Therefore, the stress on the drive and transmission system due to an abrupt change of driving force can be considerably reduced, and a shock caused by an immediate start of the vehicle can be eased. Accordingly, a very excellent driving efficiency can be obtained.

What is claimed is:

1. A throttle controller used for a vehicle comprising an automatic transmission including a torque converter, the controller comprising:

a throttle control section for calculating a degree of opening of the throttle of the vehicle for generating a driving force in accordance with the actual degree of depression of the accelerator of the vehicle, said degree of opening corresponding to a target degree of opening of the throttle for the engine so as to drive the vehicle by a target driving force calculated based on the actual degree of depression of the accelerator;

a stall condition determining means for determining a stall state in which the gear lever of the vehicle is in a driving gear; the actual degree of depression of the accelerator is larger than a predetermined degree of depression for determining the stall state; the brake of the vehicle is operated; and the speed of the vehicle is smaller than a predetermined speed; and a storage section for storing a predetermined degree of opening of the throttle which is read out when the actual degree of depression of the accelerator is larger than the predetermined degree of depression of the accelerator for determining the stall state, and wherein the throttle control section limits the target degree of opening of the throttle to the predetermined degree of opening stored in the storage section when the stall condition determining means has determined that the vehicle is in the stall state.

2. A throttle controller as claimed in claim 1, further comprising a transition timer for counting a predetermined time, the counting being started when the brake is released, after the determination of the stall state, and wherein the throttle control section calculates the target degree of opening of the throttle in a manner such that the target degree of opening of the throttle is shifted from the predetermined degree of opening of the throttle to the degree of opening of the throttle for generating a driving force in accordance with the actual degree of depression of the accelerator, during counting of said predetermined time by the transition timer.

3. A method for controlling a throttle in a vehicle having an automatic transmission including a torque converter, comprising the steps of:

calculating a degree of opening of the throttle of the vehicle for generating a driving force in accordance with the actual degree of depression of the accelerator of the vehicle, the degree of opening corresponding to a target degree of opening of the throttle for the engine so as to drive the vehicle by a target driving, force calculated based on the actual degree of depression of the accelerator;

determining a stall state in which the gear lever of the vehicle is in a driving gear, the actual degree of depression of the accelerator is greater than a predetermined degree of depression for determining the stall state, the brake of the vehicle is operated, and the speed of the vehicle is less than a predetermined speed;

storing a predetermined degree of opening of the throttle which is read out when the actual degree of depression of the accelerator is greater than the predetermined degree of depression of the accelerator for determining the stall state; and limiting the target degree of opening when the vehicle is determined to be in the stall state.

4. The method for controlling a throttle as recited in claim 3, further comprising the steps of:

counting a prederermined time after determination of the sall state, the counting being started when the brake is released; and calculating the target degree of opening of the throttle in a manner such that the target degree of opening of the throttle is shifted from the predetermined degree of opening of the throttle to the degree of opening of the throttle for generating a driving force in accordance with the actual degree of depression of the accelerator during counting of the predetermined time in the counting step.

\* \* \* \* \*